United States Patent

Dalley

[15] 3,700,926

[45] Oct. 24, 1972

[54] ELECTRONIC BILATERAL BETA ELEMENT SWITCH

[72] Inventor: James Edwin Dalley, Sherrelwood Estates, Colo.

[73] Assignee: Bell Telephone Laboratories, Incorporated, Murray Hill, Berkeley Heights, N.J.

[22] Filed: May 28, 1971

[21] Appl. No.: 147,757

[52] U.S. Cl. ....................307/257, 307/254, 307/247

[51] Int. Cl. ..............................................H03k 17/00

[58] Field of Search......307/241, 242, 243, 244, 248, 307/249, 254; 179/18 GF, 1 H

[56] References Cited

UNITED STATES PATENTS

| | | | |
|---|---|---|---|
| 3,247,323 | 4/1966 | Carroll | 307/250 X |
| 3,207,927 | 9/1965 | Wells | 307/250 |
| 3,292,010 | 12/1966 | Brown et al. | 307/246 |
| 2,891,171 | 6/1959 | Shockley | 307/254 |

*Primary Examiner*—Herman Karl Saalbach
*Assistant Examiner*—B. P. Davis
*Attorney*—R. J. Guenther and James Warren Falk

[57] ABSTRACT

An electronic reversing switch or beta element is disclosed which functions to interconnect terminals on both half cycles of a carrier signal. Connections are switched between the terminals in response to a change in a control signal. The terminals are connected via selectively enabled bridge circuits containing parallel branches that may be energized on alternate half cycles of the carrier. Each branch includes a serially connected pair of oppositely poled semiconductor devices that exhibit a high impedance between the terminals when off and a low impedance when on for any polarity of external signals. A two-telephone intercom arrangement employing the electronic switches is also disclosed.

3 Claims, 3 Drawing Figures

INVENTOR
J. E. DALLEY
BY Howard Ripper
ATTORNEY

ELECTRONIC BILATERAL BETA ELEMENT SWITCH

BACKGROUND OF THE INVENTION

This invention relates to electronic switches and more particularly to electronic switches using selectively controllable gating elements.

An ideal switch is one that would take no power to operate, would open or close its contacts instantaneously, exhibit zero resistance when the contacts are closed and infinite resistance when the contacts are open. Obviously, any practically realizable device must involve some compromise with the aforementioned desiderata. For example, the electromechanical switch or relay can generally be manufactured to have very high open and very low closed circuit contact resistance. Its operating speed cannot, however, be reduced below some several tens of milliseconds and because moving electromechanical contacts having some form of spring constant and some degree of inertia, there is a tendency of electromechanical contacts to bounce for some period of time after an initial closing. In many applications, the effects of contact bounce may be avoided because the relay can be operated before its contacts are required to carry the current whose interruption by contact bounce would be undesirable.

Thus, for example, switching network contacts in a telephone switching system are usually operated before voice transmission takes place and paths established over such contacts are not changed during the continuance of the conversation. Accordingly, the contact bounce problem has not heretofore been of surpassing concern during the interval marked by the maintenance of a conversational path in a switching network. However, in the rearrangeable telephone switching network of the type disclosed in the copending application of A. E. Joel, Jr., Ser. No. 728,157 filed May 10, 1968, now U.S. Pat. No. 3,593,295 issued July 13, 1971, and that of D.C. Opferman-N. T. Tsao-Wu Ser. No. 7,871 filed Feb. 2, 1970, now U.S. Pat. No. 3,638,193 issued Jan. 25, 1972, the connections that have been established through a switching network and which are carrying active conversations will probably be changed during the continuance of the conversation. This type of "wet contact" switching is necessary so that new switching connections may be established that would otherwise find the network blocks. The implementation of the types of rearrangeable networks disclosed in these copending applications is, however, inhibited by the fact that presently only electromechanical relays are available to perform the function of the double-throw switch or beta element, as the device is sometimes also called. The contact bounce which such electromechanical switches invariably exhibit introduces noticeable noise transients in the established conversational connection and is likely to be a certain source of customer annoyance. Moreover, the operate time of such switches is so long that noticeable gaps may occur in speech transmission when the network involving the use of such electromechanical double-throw switches is rearranged.

One approach to the solution of this dilemma is disclosed in the copending application of J. E. Dalley-N. T. Tsao-Wu Ser. No. 147,758 filed of even date herewith. Therein, an electronic reversing switch is disclosed that affords nearly instantaneous response, freedom from "contact" bounce, low drive power, and the characteristic of being able to change the connection paths, i.e., to throw the switch from one mode of connection to the other, merely by changing the polarity of the control signal. That arrangement employs two transformers which are supplied with a carrier signal whose phase was alterable in accordance with the polarity of the control voltage. The phase in which the carrier is applied to the transformers determined which of a pair of input diode bridges would be rendered conductive so as to make a connection from a pair of input terminals to a common bus during a particular half cycle of the carrier and which of a pair of output diode bridges would be rendered conductive during that half cycle to complete the connection from the common bus to one of a pair of output terminals. Arrangements are disclosed therein that provided for connection of a given input to a given output terminal during alternate and also during successive half cycles of the carrier frequencies, the former introducing a 3 dB insertion loss because of the "half wave" nature of operation with respect to the latter. In these arrangements, the half-wave version requires four diode bridges employing a total of 16 diodes. While the above-mentioned approach yields satisfactory results, it would be desirable to provide an electronic reversing switch employing fewer semiconductor elements, which could switch high power signals, and which would introduce a somewhat lower insertion loss. Accordingly, it is an object of the present invention to provide an improved electronic reversing switch which exhibits low insertion loss, is fast acting, and which requires low drive power.

The foregoing and other objects of the present invention are achieved with one illustrative embodiment in which an electronic reversing switch is provided by selectively directing carrier signals to a first or a second control transformer each of which when supplied with the carrier signal controls conduction in a pair of bilateral semiconductor switching device. Each of such switching devices includes a pair of parallel branch paths, each of such branch paths including a pair of oppositely poled semiconductor elements of the same conductivity type. When the transformer associated with a given one of the bilateral semiconductor devices is supplied with carrier signals one or the other of the branch paths will have both of its oppositely poled semiconductor devices rendered conductive to provide switching path connections on each half of the carrier half cycle. When the transformer associated with the aforementioned switching devices is not supplied with carrier signals, the oppositely poled semiconductor devices in each of the branch paths exhibit high impedance and effectively provide an open circuited switching connection.

In accordance with a further aspect of the present invention, the selection of the transformer to which the carrier signals are to be steered is controlled by the polarity of a control signal. The control signal is applied directly to an input of each of two NOR gates associated with the carrier drive circuit for one transformer and inverted to each input of two NOR gates associated with the carrier drive circuit of the other transformer. The carrier signal is applied directly to one input of a NOR gate associated with each of the carrier drive circuits and inverted to an input of the other of the NOR gates of each drive circuit. Accordingly, the carrier will be applied to drive one of the transformers in push pull and will be blocked from the other of the transformers.

In an application of the bilaterial double-pole, double-throw switching device of the present invention, connections of two telephones in an intercom arrangement may selectively be made either to the input or output ports of an intercom trunk by appropriate steering of the carrier drive signal. The input and output ports of the intercom trunk define respectively the ports to which the calling and called telephones are to be connected. Logic circuitry associated with the intercom trunk steers the carrier drive signal to cause a ringing source to be connected to the output port of the intercom trunk and disconnects the ringing source to trip ringing when the called telephone answers.

DeSCRIPTION OF THE DRAWING

The foregoing and other objects and features may become more apparent by referring now to the drawing in which:

Referring now to FIG. 1 there is shown the electronic bilateral double-pole, double-throw switch of my invention. Connections may be established between terminal L1 and terminal L2 or L4 at the same time that connections are established between the terminals L3 and L4 or L2, respectively. Considering the upper two bridges B1 and B3 associated with transformer T1, a bilateral connection between terminals L1 and L2 is effected by the turning on of semiconductor devices QA and QB or QC and QD in bridge B1. Simultaneously, bilaterial connection between terminals L3 and L4 is effected when the semiconductor elements QE and QF or QG and QH of bridge B3 are activated. In the illustrative embodiment bridges B1 and B3 will simultaneously be activated. When bridges B1 and B3 are activated, bridges B4 comprising semiconductor elements QJ, QK, QL, QM, and bridge B2 comprising semiconductor elements QN, QP, QR, and QS will be in a nonconducting, high impedance or open circuit condition.

Figures 1, 2:
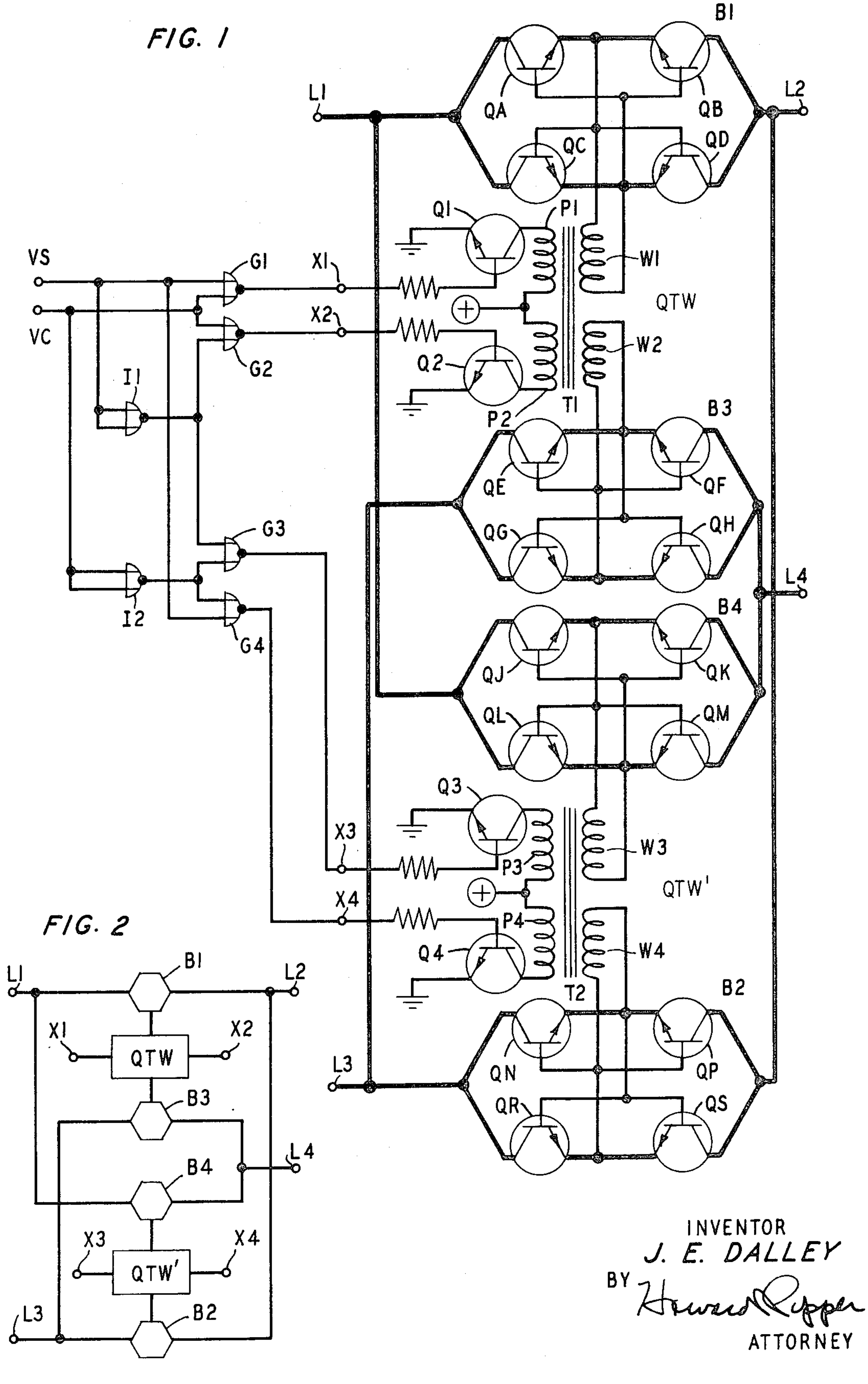
FIG. 1 shows a double-pole, double-throw electronic switch according to the present invention.
FiG. 2 shows the circuit of FiG. 1 in a highly schematized and simplified form.

The connection of the semiconductor elements within each of the four bridges in FIG. 1 is substantially similar. Each bridge comprises an upper and a lower branch with each branch containing a pair of serially connected transistors. For example, in the upper branch of bridge B1 two transistors QA and QB of the same conductivity type are connected in series having their emitter electrodes as the point of conjunction. The transistors QA and QB, poled oppositely to each other, when rendered conductive provide a collector-emitter, emitter-collector path for external signals applied at terminals L1 and L2. Similarly, in the lower branch comprising the oppositely poled transistors QC and QD, a collector-emitter, emitter-collector path may be provided for signals between terminals L1 and L2. So long as transistors QA and QB in the upper branch and transistors QC and QD in the lower branch path are off a high impedance is exhibited between terminals L1 and L2. If a voltage is applied to L1 which is negative with respect to L2, the collector-base junction of QA will be forward biased. Since the bases of QA and QB are connected together, the applied voltage appears across the collector-base junction of QB. With no bias applied to the base-emitter junction of QB, the emitter-base junction is reverse biased by the external signal applied between L1 and L2. Thus a high impedance is maintained.

The same is true when the external signal causes L1 to be positive with respect to L2, except the emitter-base junction of QA now provides the open circuit.

The emitter-base breakdown voltage determines the maximum voltage that can be applied to the open switch. Accordingly, with no signal provided by winding W1, the transistors of bridge B1 maintain a high effective impedance between terminals L1 and L2.

In order to enable bridge B1 to provide a conducting path from terminal L1 to terminal L2 and vice versa, transformer T1 must be energized to permit secondary winding W1 to deliver a turn-on potential to the base emitter junctions of the transistors in bridge B1. Assuming that the primary windings P1 and P2 of transformer T1 are supplied with a square-wave carrier signal, winding W1 will deliver alternate polarity turn-on signals to the base emitter junctions of the transistors in bridge B1. When the lower end of winding W1 is positive with respect to the upper end of its winding, transistors QA and QB in the upper branch of bridge B1 will have their base emitter junctions forward biased causing these transistors to turn on. When transistors QA and QB are turned on, they provide a low impedance path between terminals L1 and L2 for all magnitudes of external signals that may be applied to terminals L1 and L2, provided the external signals are not so great as to overcome the forward bias of the base emitter junction of either transistor QA or QB. During the next half cycle of the carrier signal winding W1 will provide an opposite polarity drive signal to the transistors of bridge B1. Transistors QA and QB will be turned off but transistors QC and QD in the lower branch of bridge B1 will be turned on. These transistors now provide the low impedance path for external signals between terminals L1 and L2.

At the same time that winding W1 delivers alternate polarity pulses to maintain the semiconductor devices of bridge B1 conducting, winding W2 of transformer T1 delivers turn-on pulses alternately to semiconductor devices QE, QF, QG and QH in the upper and lower branches of bridges B3. Accordingly, so long as the primary windings of transformer T1 are supplied with carrier drive signals, bridges B1 and B3 supplied by individual secondary windings W1 and W2 of transformer T1 will simultaneously be rendered conductive.

The selection of which pairs of the terminals L1, L2 and L3, L4 or L1, L4 and L3, L2 are to be interconnected is determined by the control signal applied at terminal VC and the instantaneous carrier signal applied at terminal VS. The control signal is applied to one input of each of the NOR gates G1 and G2 directly and, in inverted fashion, to one input of each of NoR gates G3 and G4 via inverter I2. The carrier signal at terminal VS is applied directly to the remaining terminal of NOR gates G1 and G4 and inverted, via inverter I1, to the remaining terminal of NOR gates G2 and G3. Accordingly, the output of NOR gate G1 will be in the high signal condition when the carrier applied at VS and the control signal at terminal VC are each in the low signal state. The output of NOR gate G2 will be in the high signal state when the control signal at VC is low and the carrier at VS is in the high signal state. Accordingly, so long as the control signal at terminal VC is in the low signal condition, the outputs of gates G1 and G2 are high on alternate half cycles of the carrier. When the output of gate G1 is in the high signal condition, transistor Q1 is rendered conductive thereby completing a current path to the upper primary winding P1 of transformer T1. When the output of NOR gate G2 is in the high signal state, transistor Q2 is enabled to complete a current path to the lower primary winding P2 of transformer T1. Accordingly, it is seen that with the control signal applied at terminal VC in the low signal condition, the primary windings P1 and P2 of transformer T1 are energized in push pull on successive carrier half cycles. Since there is no sustained direct current in the primary of transformer T1, there is no danger of saturating the core and consequently transformer T1 can be physically quite small.

DUring the time that the control signal applied at terminal VC is in the low signal state, NOR gates G3 and G4 are blocked by the output of inverter I2. Accordingly, no carrier signals are applied to transistors Q3 and Q4 and transformer T2 delivers no signals to unblock bridges B4 and B2.

When it is desired to unblock bridges B4 and B2 and to block bridges B1 and B3, the control signal applied at terminal VC is raised to a high signal condition. For example, when the bridges B1 and B4 are desired to provide connection paths for telephone conversations, a carrier frequency of 25 kHz may be applied at terminal VS having a square-wave shape for switching between a magnitude of O and +5 volts. Under these circumstances, a control signal that is switched between 0 and 5 volts may be employed at terminal VC. In one illustrative embodiment in which the semiconductor devices QA through QS of bridges B1 etc. were type WE66J manufactured by the Western Electric Company, 50-volt external signals were delivered into 500-ohm loads at the terminal L1 and L4 under the control of carrier and control signals applied at terminals VS and VC, respectively. As will be hereinafter described, higher voltage external signals may successfully be switched by connecting additional semiconductor elements in series with the arms of a particular bridge. For example, in a telephone environment where conventional 105-volt rms ringing signals are to be withstood, in addition to the 48-volt battery, the peak voltage that may be applied to the semiconductor devices of a bridge may be as high as 149 plus 48 or 197 volts. In one experimental embodiment, accordingly, two semiconductor bridges consisting of type 66J transistors were employed in series (see FIG. 3 hereinafter) and successfully operated with the foregoing voltages.

Figure 3:
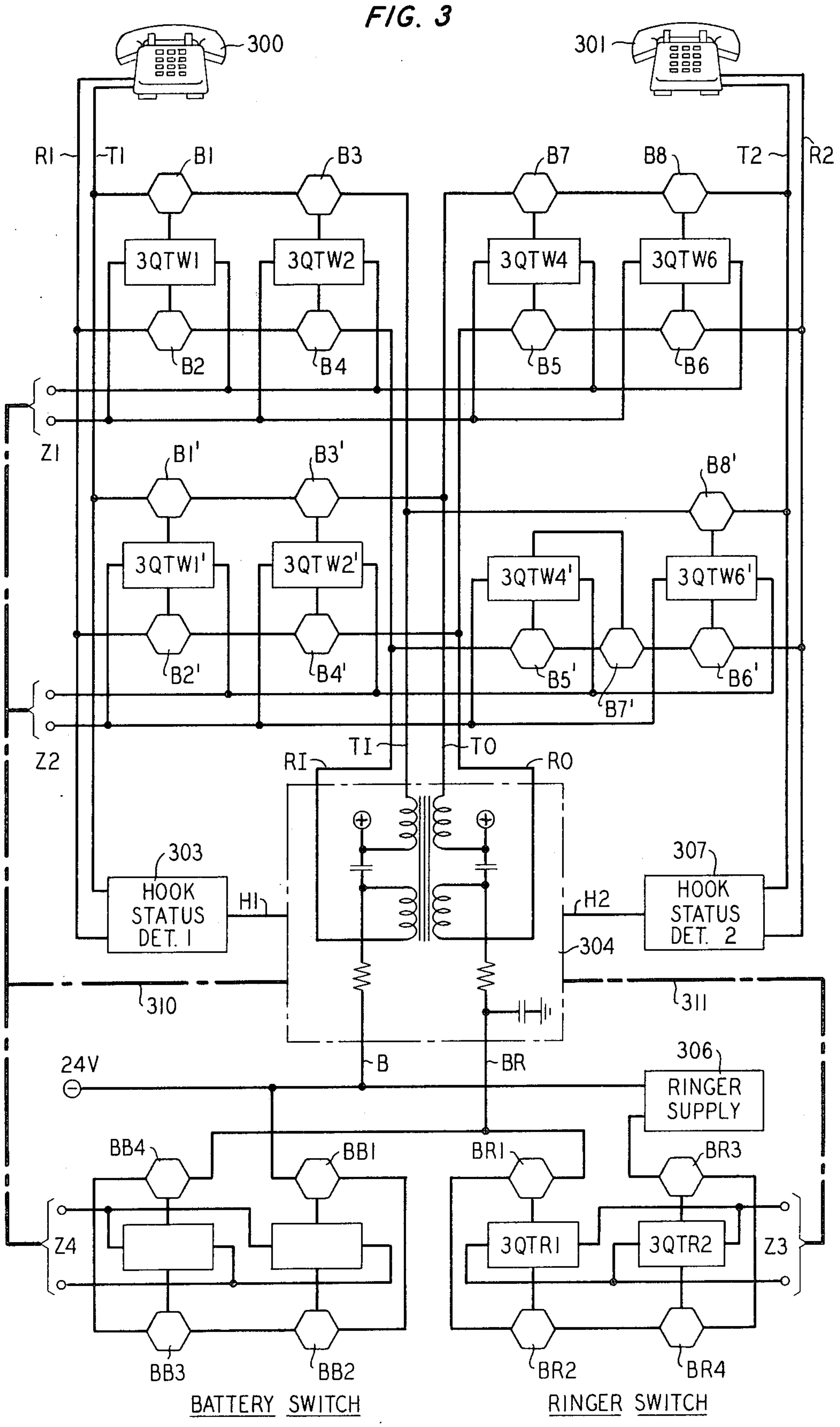
FIG. 3 shows an illustrative intercom switching system employing the electronic reversing switch of my invention.

Referring now to FIG. 2, the circuitry of FIG. 1 is shown redrawn in a more abbreviated and stylized form so that more complex combinations of the basic circuit of FIG. 1 may be depicted, as in FIG. 3, without the proliferation of inconvenient detail. In FIG. 2 the hexagonal figures labelled B1 through B4 correspond to the transistor bridges B1 to B4 of FIG 1. The rectangular symbols labelled QTW and QTW' correspond to the circuitry comprising gates G1, G2, transistors Q1, Q2, and transformer T1 of the upper part of FIG. 1 and gates G3, G4, transistors Q3, Q4, and transformer T2 of the lower part of FIG. 1, respectively. As redrawn, the circuitry of FIG. 2 illustrates that terminal L1 can be connected to terminal L2 through bridge B1 or to terminal L4 through bridge B4. Likewise terminal L3 can be connected to terminal L2 through bridge B2 or to terminal L4 through bridge B3.

With the condensed symbolism thus understood, we may turn now to FIG. 3 wherein an illustrative two telephone intercom switching arrangement is depicted which employs several of the gating elements of FIG. 2. Telephone set 300 at the upper left-hand side of FIG. 3 may initiate a call to telephone set 301 at the upper right-hand side of FIG. 3 and in turn, telephone set 301 may initiate calls to telephone set 300. Assuming that telephone set 300 desires to call set 301, set 301 will be placed in the off-hook position. Hook status detector 303 is connected across leads T1 and R1 and responds to the change in potential occurring on these leads when set 300 goes off-hook. Numerous types of hook status detector circuits are well known and accordingly, the details thereof are not shown.

Responsive to the off-hook condition of set 300 circuit 303 energizes logic circuit 304 over lead H1. With lead H1 energized, logic circuit 304 applies carrier signal voltage over cable 310 to terminals Z1. The carrier signal should have a frequency of at least twice the frequency of signals to be exchanged between sets 300 and 301 and in one embodiment a carrier signal of 20 kilohertz was successfully employed. The application of carrier signal to terminals Z1 energizes control elements 3QTW1, 3QTW2, 3QTW4, 3QTW6 at the upper part of FIG. 3. The energization of control element 3QTW1 activates bridges B1 and B2, while the energization of control element 3QTW2 activates bridges B3 and B4. Since control elements 3QTW1 and 3QTW2 are simultaneously energized by the identical phase of carrier signal applied at terminals Z1, bridges B1 and B3 and B2 and B4 are energized simultaneously. The simultaneous energization of bridges B1 and B3 extends the continuity of tip lead T1 from telephone set 300 to input tip lead T1 at the incoming side of intercom trunk 304. The simultaneous energization of bridges B2 and B4 extends the continuity of ring lead R1 from telephone set 300 to the input ring lead RI of intercom trunk 304.

Upon responding to the energization of lead H1 by hook status detector 303, intercom logic circuit 304 connects carrier signal over cable 311 to terminals Z3. The appearance of carrier signal at terminal Z3 energizes control elements 3QTR1 and 3QTR2. Bridges BR1, BR2, BR3 and BR4 are all simultaneously energized. The simultaneous energization of these bridges connects ringer supply 306 to terminal BR of intercom trunk 304 over a path which includes a serial connection of bridge elements BR3, BR4, BR2, and BR1. Four such bridge elements are employed in series in the illustrative embodiment to provide sufficient protection to the transistors comprising each of the bridges, it being assumed that a comparatively high voltage to ringer supply 306 is employed. In one illustrative embodiment, a ringer supply have a constant output of 105 volts rms at 20 hertz with a 60 hertz component superimposed upon it was employed. The ringing signal applied to terminal BR of trunk 304 is forwarded by that trunk to lead RO on the output side of the trunk. Since it will be recalled that control elements 3QTW4 and 3QTW6 were enabled by the application of carrier signal to terminal Z1, the continuity of lead RO is extended by bridge B5 associated with element 3QTW4 and bridge B6 associated with element 3QTW6 to lead R2 at telephone 301. Similarly, the continuity of lead TO at the output side of the intercom trunk 304 is extended by bridges B7 and B8 to lead T2 at telephone set 301. Trunk 304 provides conventional battery feeds to leads RI and TI at its input side and to terminals TO and RO at its output side and a transformer coupled audio path between terminals RI and TI and RO and TO. Accordingly the ringing signal applied to terminal BR is forwarded by trunk 304 to lead RO and by bridges B5 and B6 to lead R2 and telephone set 301.

After approximately one second of ringing logic circuit 304 transfers the carrier drive of terminals Z3 to Z4. The removal of carrier drive from terminal Z3 disconnects ringer supply 306 from terminal BR. The application of carrier drive to terminal Z4 connects negative 24 volt battery to terminal BR over a path which includes serially connected bridges BB1, BB2, BB3 and BB4. After approximately three seconds, the carrier is removed from terminal z4 and restored to terminal Z3 for another interval of 1 second and so on, providing conventional active ringing of 1 second on and 3 seconds off until the station user places set 301 in the off-hook position to answer the call.

When set 301 is placed in the off-hook position, hook status detector 307 energizes lead H2, logic 304 responding to the energization of lead H2 to remove carrier from the terminals Z3 and to allow the carrier to be applied to terminal Z4 thereby providing set 301 with continuous talking battery. At this point set 301 is provided with talking battery permanently connected to terminal B at the input side of trunk 304 while telephone set 301 is provided with talking battery connected to terminal BR at the output side of trunk 304. At the completion of the call indicated by either telephone set returning to the on-hook condition, the associated one of hook status detectors 303 or 307 removes the energization of its respective one of leads H1 or H2. Responsive to the removal of energization logic 304 disconnects carrier signal from lead Z1 and Z4 causing all switches to be open.

If telephone 301 had initially been placed in the off-hook condition to initiate a call to telephone 300, the process would be similar except that the second row of line switches would be activated. That is, hook status detector 307 responding to the off-hook state of set 301 would energize lead H2. Logic 304 thereupon applies carrier to terminals Z2 instead of Z1. The application of carrier to terminal Z2 energizes control elements 3QTW1′, 3QTW2′, 3QTW4′ and 3QTW6′. The energization of control elements 3QTW4′ and 3QTW6′ extends the continuity of leads T2 and R2 to leads T1 and RI, respectively at the input side of intercom trunk 304. The energization of control elements 3QTW1′ and 3QTW2′ extends the continuity of leads TO and RO at the output side of intercom trunk 304 to leads T1 and R1 at telephone set 300. Since telephone set 300 is now connected to the output side of trunk 304, it will receive the ringing signal instead of telephone 301. The second row of line switches comprising control elements and associated bridges bearing the same reference numerals as the corresponding devices in the first row (except that the devices in the second row have primed reference numerals) are connected identically except for bridge B7′ associated with control element 3QTW4′. Bridge B7′ is shown connected in series with bridges B5′ and B6′ to illustrate the fact that bridge elements may be serialed to increase the signal voltage capable of being switched (or withstood in the open circuit condition).

Accordingly, I have shown an electronic bilateral reversing switch capable of performing a double-pole, double-throw switching function together with an illustrative telephone intercom switching arrangement in which battery potential and ringing supply may selectively be switched according to which telephone is the calling and which is the called telephone. Further and other arrangements may be devised by those skilled in the art without departing from the principles of my invention.

What is claimed is:

1. An electronic reversing switch for connecting each of a first and second input terminal exclusively to either the first or second of two output terminals comprising, four electronic bridge circuits, each of said bridge circuits having parallel branches wherein each branch includes a pair of serially connected transistor elements, at least one corresponding electrode of each of said transistor elements being connected together, a first and a second source of pulses, said first source being connected to the first and second of said bridge circuits and said second source being connected to the third and fourth of said bridge circuits, said first bridge circuit being connected between said first input and said first output terminal, said third bridge circuit being connected between said first input and said second output terminal, said second bridge circuit being connected between said second input and said second output terminal and said fourth bridge circuit being connected between said second input and said first output terminal, and control circuit means for rendering either said first or said second source of pulses operative to apply pulses to its respective ones of said bridge circuits.

2. An electronic switch comprising a pair of input and output terminals, a plurality of electronic bridge circuits connecting each of said input terminals with each of said output terminals, each of said bridge circuits including a first and a second pair of oppositely poled, serially connected semiconductor devices, the oppositely poled devices of said first pair being connected in parallel with said devices of said second pair, and a plurality of pulse sources including a respective transformer coupled to pairs of said bridge circuits and controllable to apply enabling pulses to either the pair of said bridge circuits connecting a first of said input terminals with a first of said output terminals and the second of said input terminals with the second of said output terminals or to the pair of said bridge circuits connecting the first of said input terminals to the second of said output terminals and the second of said input terminals with the first of said output terminals.

3. An electronic reversing switch circuit comprising a first and a second pair of oppositely poled, serially connected semiconductor devices and means for applying one polarity of pulse signals to a common junction of one of said serially connected pair of semiconductor devices and the oppositely poled signal to the corresponding junction of the other of said pair of serially connected semiconductor devices, said signal applying means including a bipolar pulse source having a pulse transformer connected to said common junction and said corresponding junction of said semiconductor devices, a source of carrier signals, a source of control signals, and gating means connected to said source of control signals for selectively applying said source of carrier signals to said pulse transformer, aid gating means having a pair of NOR gates each having an input terminal connected to said source of control signals, one of said NOR gates having its other input terminal connected directly to said source of carrier signals and the other of said NoR gates having its other input terminal connected to receive said carrier signals inverted.

* * * * *